United States Patent [19]

Miller

[11] 3,842,212

[45] Oct. 15, 1974

[54] TELEPHONE SUBSCRIBER RECORDED ANNOUNCEMENT SYSTEM

[75] Inventor: Harlan E. Miller, Old San Juan, P.R.

[73] Assignee: International Telephone and Telegraph Corporation, Nutley, N.J.

[22] Filed: Nov. 20, 1972

[21] Appl. No.: 307,908

[52] U.S. Cl. ................ 179/91 R, 179/96, 339/17 R

[51] Int. Cl. ................................................ H04g 1/24

[58] Field of Search ............ 179/175 R, 98 R, 91 R, 179/6 C, 96

[56] References Cited

UNITED STATES PATENTS

| | | | |
|---|---|---|---|
| 2,169,988 | 8/1939 | Norrito | 179/96 |
| 2,482,998 | 9/1949 | Andersson | 179/91 R |
| 2,824,907 | 2/1958 | Peterson | 179/6 C |
| 2,849,700 | 8/1958 | Perkin | 179/98 |
| 2,920,147 | 1/1960 | Sellers et al. | 179/6 C |
| 3,312,927 | 4/1967 | Garrett | 179/98 |
| 3,627,929 | 12/1971 | Gilissen et al. | 179/96 |
| 3,704,347 | 11/1972 | Brown | 179/91 R |

*Primary Examiner*—Kathleen H. Claffy
*Assistant Examiner*—Mitchell Saffian
*Attorney, Agent, or Firm*—John T. O'Halloren; Menotti J. Lombardi, Jr.

[57] ABSTRACT

By way of a special plug-jack arrangement for application on the main distributing frame of the central office telephone equipment, an out-of-service subscriber is cut-off from the central office and coupled instead to a recorded message defining the specific nature of the out-of-service condition. Also, any incoming calls attempting connection with such an out-of-service subscriber are answered instead by having the calling party coupled by way of the same plug-jack arrangement to a second recording which informs the caller of the general out-of-service status.

4 Claims, 8 Drawing Figures

PATENTED OCT 15 1974

SHEET 3 OF 3

3,842,212

TELEPHONE SUBSCRIBER RECORDED ANNOUNCEMENT SYSTEM

BACKGROUND OF THE INVENTION

This invention relates to a system that gives a recorded announcement to a telephone (or PABX) which has been temporarily disconnected at the telephone central office.

At present, systems are available to give a recorded message to persons calling a phone that has been disconnected; however, the disconnected party does not receive a message, the party only knows that he is out of service, not why. The present system invention provides recorders to inform both incoming callers and the disconnected subscriber. Where the disconnected subscriber is out of service, as usually is the case, for non-payment, the recorder will so indicate, to him.

Another type of subscriber situation is where new central office equipment is being installed, but will not be ready for service until a certain date. This system allows the phones to be installed and an appropriate message given to the new phone. Incoming calls would be given a temporary-out-of-service message up until the in-service date. This message could be the same for both if desired.

SUMMARY OF THE INVENTION

To accomplish this, a special isolation jack and plug system is proposed for application on the central office main distributing frame (MDF).

It is therefore the principal object of this invention to provide, by way of a single plug arrangement, a system providing recorded messages to the calling party and out-of-service subscriber, informing each as to the existence of subscriber disability.

According to the broader aspects of the invention, there is provided a system for connecting recorded messages to telephone subscribers' lines for application on the main distributing frame of the central office telephone equipments, comprising an isolation plug-jack arrangement including first means for separating an out-of-service subscriber's line from the central office equipment and second means for coupling the subscriber's line to recorder distribution means and thereby connect to the subscriber a recorded message defining the nature of the out-of-service condition.

Moreover, there is provided according to the invention a unique plug arrangement comprising a plurality of pins of polygonal cross-section comprised of dielectric material, each of said pins having a plurality of metallic contact strips in one-to-one correspondence with said polygonal pin sides, each such strip being inlaid in a recess of cooperating shape in the associated pin side; and a printed circuit board arranged to be coupled to said inlaid contact portions of said pins and to provide appropriate connections therebetween, the printed circuit board and pins being assembled to form a single plug unit.

The isolation arrangement comprises a single plug which in addition to providing the above-mentioned first and second means further includes third means for answering incoming calls to the out-of-service subscriber and coupling a calling subscriber to a separate recorded message from the recorder distribution means, informing the calling subscriber of the out-of-service status.

The invention provides a number of arrangements for distributing the recorded announcement to the MDF isolation jack, but each employs the basic principles of using a single plug to:

1. Separate the disconnected subscriber's line from the central office equipment.
2. Connect the disconnected subscriber to a recorded announcement.
3. Answer the incoming call and connect it to a different recorded announcement.

The plug contains the circuitry for disconnecting the station phone, coupling to the recorders and for answering the incoming calls. A limitation on answering incoming calls is that the calling subscriber must be able to hold the call through to the called subscriber. This is standard or optional in most U.S. central offices.

A feature of this invention is that this recorded announcement distributing system is designed to be directly operable with existing isolation jacks.

A further feature is that this invention can be used with any kind of central office that uses cross-connection wires to connect the subscriber's telephone to the central office.

BRIEF DESCRIPTION OF THE DRAWINGS

The above-mentioned and other objects and features of this invention will become more apparent and the invention itself will be best understood by reference to the following description taken in conjunction with the accompanying drawings, in which.

DESCRIPTION OF THE PREFERRED EMBODIMENTS

This invention provides several arrangements for connecting recorded messages to subscribers' lines on the main distributing frame (MDF). All of the arrangements involve the use of MDF isolation jacks. In each of the arrangements a single plug is used to connect messages from a master tape recorder with stored messages. This recorder runs continuously.

Figure 1:
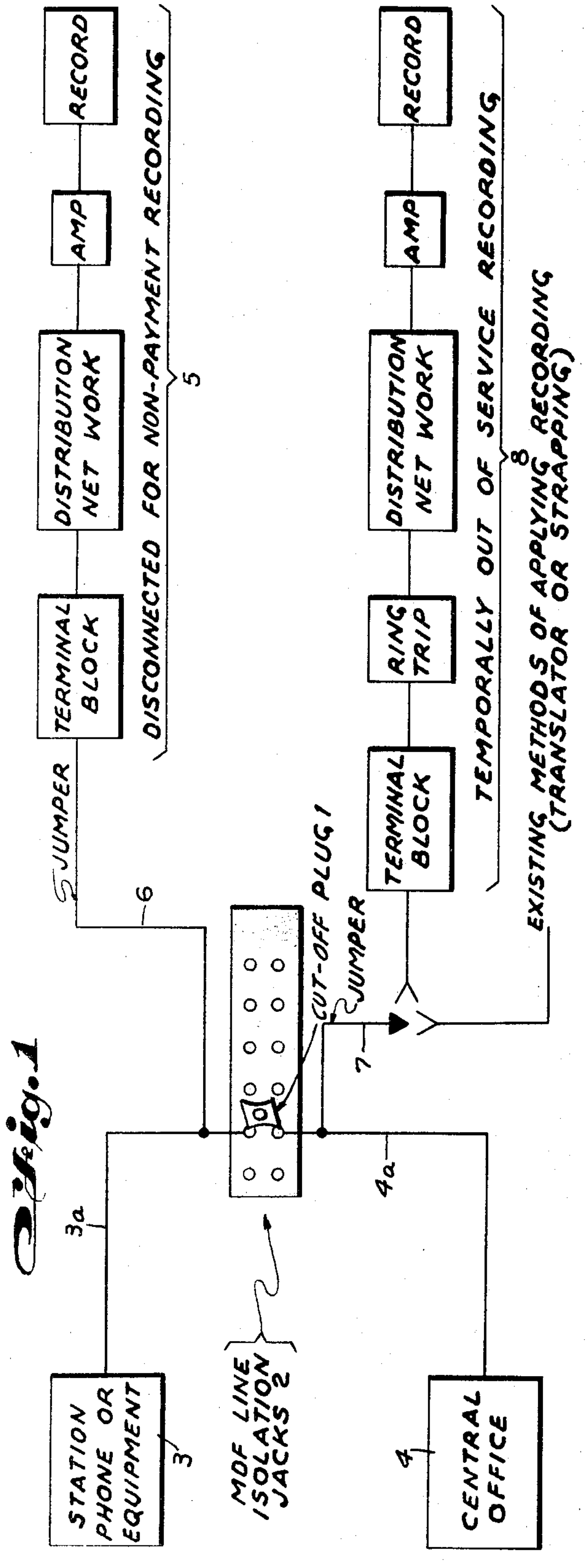
FIG. 1 illustrates in a schematic block diagram one system arrangement utilizing the inventive plug-jack arrangement according to the invention.

Referring to FIG. 1, there is illustrated therein in schematic block diagram form a first system arrangement according to the invention in which a cut-off plug and jumpers are used to effect a connection of the out-of-service subscriber with a recorded message announcing the out-of-service condition. A cut-off plug 1 is inserted into the appropriate one of the MDF line isolation jacks designated as 2 in FIG. 1. The standard cut-off plug 1 would be used to cut off the subscriber's line *3a* from the central office 4. A jumper from the subscriber line 3a would be cross-connected via 6 to the recorder distribution block, in this case to that portion thereof which bears a non-payment recording message indicated by the general reference designator 5. Customers would not be able to talk with each other because d.c. voltage is not present to operate the disconnected subscriber's microphone. Also the recorder coupling capacitors are too small to pass normal subscriber communications through the recorder common system. To put the line in service, the jumper 6 to the recorder would be removed as well as the cut-off plug 1.

FIG. 1 further illustrates the fact that the portion of the subscriber's line running to the central office, i.e., 4*a*, may be connected by way of a jumper 7 to a second portion of the recorder distribution means generally designated 8 in FIG. 1, wherein a message is given to any calling party to the out-of-service subscriber 3, indicating the out-of-service status to the calling party. It is to be noted that whereas the subscriber himself is notified as to the specific out-of-service condition, for example non-payment, the calling party is only informed of the general out-of-service status.

Figure 2:
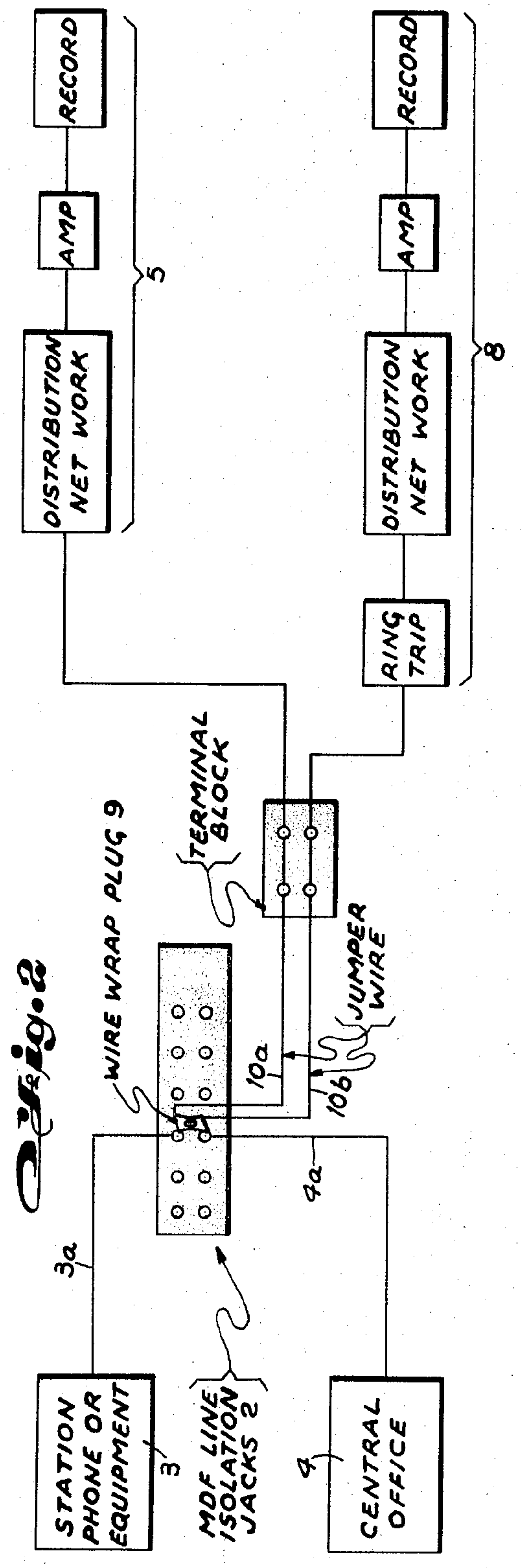
FIG. 2 is a schematic block diagram illustrating a second system arrangement according to the invention.

Referring now to FIG. 2, there is illustrated therein in schematic block diagram form a second system arrangement according to the invention. Reference designators in FIG. 2 are identical with those in FIG. 1 for like equipments. In this arrangement, a special plug 9 would be used to cut-off or separate the subscriber's line 3*a* from the central office 4. The plug 9 would be cross-connected to the recorder system 5. The cross-connection would be by way of jumper wire 10*a*. The terminating plug 9 would be inserted into a jack associative to the recorder system. Service to the line 3*a* would be restored by removing the special plug. The plug 9 may be wired so that both the incoming caller and the subscriber 3 could hear a recording, but they would not be able to talk to each other. Different messages, i.e., recorder 5 and recorder 8 respectively, could be given to the subscriber and to the incoming caller. Plug 9 could be of the wire wrap terminal type so as to easily facilitate connection of the jumper wire thereto. In this configuration, the plug 9 would have a plastic central body with the plug split pins protruding from one end thereof and wire wrap terminals protruding from the opposite end.

Also as shown in the arrangement of FIG. 2, the subscriber's line 4*a* leading to the central office may be coupled to a second recording system 8 by way of jumper wire 10*b*, whereby any calling party trying to reach the out-of-service subscriber 3 would instead receive a recording from the system 8 informing the caller of the called subscriber's general out-of-service status.

Figures 3, 4, 5:
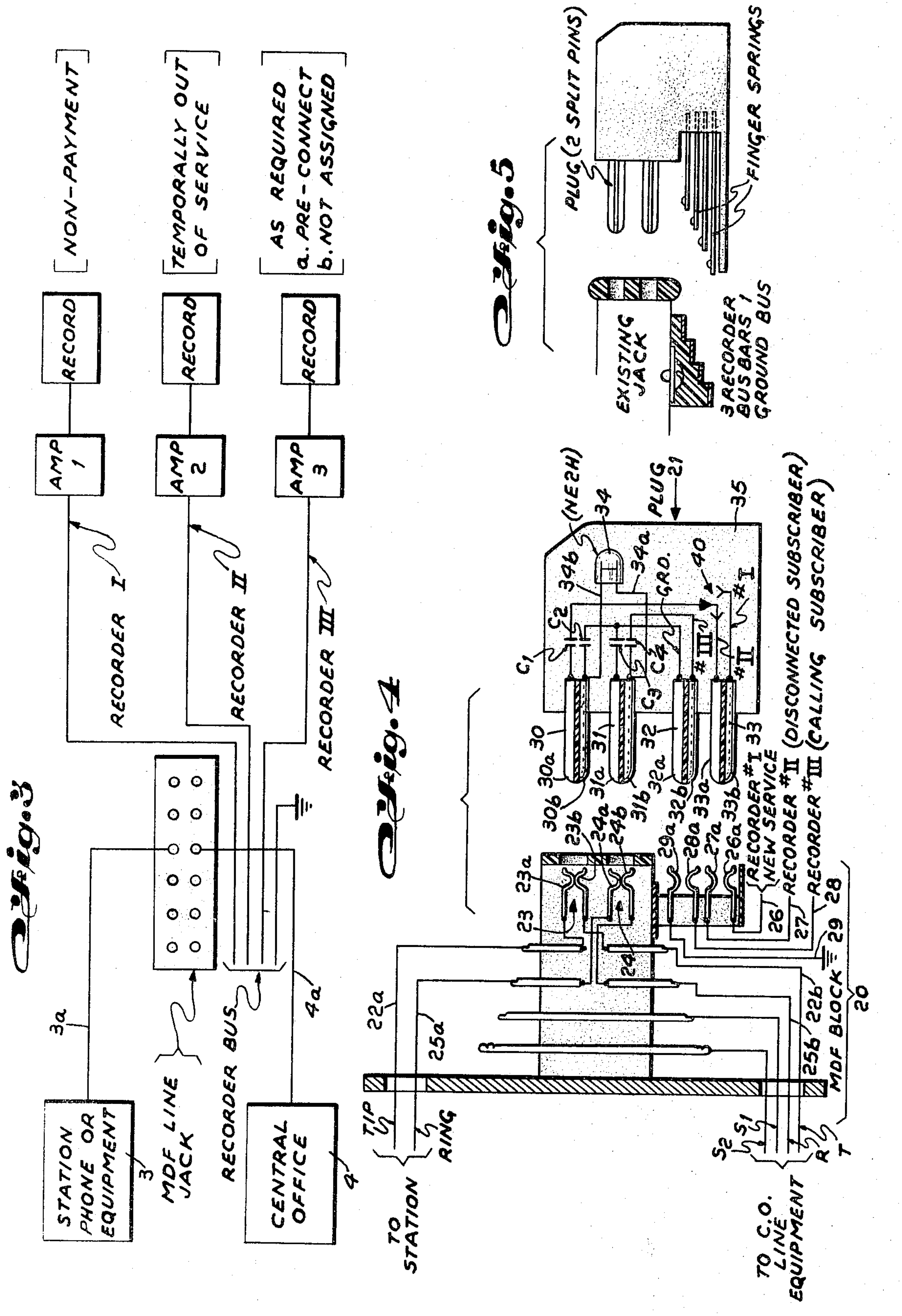
FIG. 3 is a schematic block diagram of yet another system arrangement according to the invention.
FIG. 4 is an enlarged schematic illustration of a preferred plug-jack arrangement implementing the system of FIG. 3 in accordance with the invention.
FIG. 5 schematically illustrates an alternative implementation of the invention in terms of a corresponding existing jack arrangement.

Referring to FIG. 3, there is illustrated in a schematic block diagram a third system arrangement according to the invention wherein a special plug and plug-jack arrangement is employed with the MDF being equipped with a recorded announcement bus bar. The system arrangement of FIG. 3 only shows the MDF line jack with recorder bus coupled to three different recordings. Thus, it remains for FIG. 4 to be considered in conjunction therewith as to the specific arrangement of the plug jack relationship for providing the intended recorded announcements. In FIG. 4 there is shown the three-recorder split-pin plug and jack arrangement, wherein the MDF block is modified by the bus bar arrangement to accept the special plug arrangement 21 shown. The plug 21 is comprised of four split pins 30–33 wherein each is separated by an insulator into two halves 30*a*, 30*b*–33*a*, 33*b*. The pin connections within the plug 21 have the top half 30*a* of the first pin 30 coupled by way of capacitor C1 to the top half 33*a* of the fourth pin 33, which is intended to be coupled to the recorder II which is the message to the disconnected subscriber. The bottom half 30*b* of split pin 30 is coupled by way of a second capacitor C2 to the top half 32*a* of split pin 32 which is intended to be coupled to ground. In addition, top half 31*a* of second pin 31 is also coupled to this ground by way of capacitor C3. The bottom half 31*b* of pin 31 is coupled by way of a fourth capacitor C4 to the bottom half 32*b* of pin 32 which is intended to be coupled to recorder III arranged to inform the calling subscriber of the out-of-service status. Also, the bottom half 33*b* of fourth pin 33, while not shown to be intercoupled in FIG. 4 in the plug arrangement shown in FIG. 4, is intended to be coupled to the recorder I which is slated to give the recorded message of new service.

Also connected to the bottom half of pin 30 and to the bottom half of pin 31 is a neon bulb device 34 that is used to trip the ring-cut-off relay when a call reaches this plug. The ring-trip arrangement is used in all of the aforementioned systems for answering incoming calls and causing the Central Office equipment to switch through to the recorded annoucements. The use of a neon lamp to answer the calls is a unique part of this invention. The principles of operation are as follows:

The Central Office ringing voltage is 110 Volts RMS which is superimposed on negative 50 Volts DC Central Office Battery.

These potentials are passed through a ring cut-off relay and out to one side of a subscriber's line (A), through the ringer of the phone and return by the other side of the subscriber's line (B) to ground. When the subscriber answers, a network in the phone is connected across the two lines A and B to provide a resistance short. This completes the operate circuit for the ring cut-off relay which then operates and in turn causes the Central Office equipment to switch through to the recorded announcement.

The purpose of the neon lamp is to simulate the customer answering the phone. Only neon lamps that can pass sufficient current to operate the ring cut-off relay will work. An additional requirement is that the short must be removed after the Central Office switches through to the recorded annoucement. Again the neon lamp satisfies this requirement, since when the ring cut-off relay operates it removes the potentials that cause the neon lamp to operate. In the non-conductive state the neon lamp will not cause a short sufficient to operate the C.O. equipment, nor will it attenuate the recorded announcements levels.

Looking at the MDF block 20 in FIG. 4, it may be seen that the ring circuit between the out-of-service subscriber and the line equipment going to the central office is constituted by the line connections of 25*a*, spring contact 24*a*, spring contact 24*b* and line 25*b*. The tip circuit is constituted by line 22*a*, spring contact 23*a*, spring contact 23*b* and line 22*b*. Thus, it may be seen that with the special plug 21 in its disconnected state as shown the subscriber is coupled to the central office line equipment by way of spring contact sets 23 and 24.

With the insertion of the plug 21 into the MDF isolation jack, the tip and ring paths are interrupted so as to isolate the out-of-service subscriber from the central office equipment in the following manner. The ring circuit connection as far as the out-of-service subscriber is concerned now consists of line 25*a*, spring contact 24*a* in contact with top half 31*a* of the second pin 31 of plug 21, capacitor C3, split pin 32, top half of pin 32*a*, to jack 29*a* and to 29 ground. This completes the transmission path for recorded announcement II.

The tip circuit of the out-of-service subscriber may be seen as being a connection involving line 22*a* and spring contact 23*a*, the top half 30*a* of split pin 30, through capacitor C1 onto the top half 33*a* of split pin 33 which is in contact with bus bar spring contact 27*a* leading to the line 27 for recorder II which carries the specific out-of-service condition to the disconnected subscriber. Thus, upon attempting to make a call, he will receive a recorded message informing him of the specific out-of-service condition.

Looking at the tip circuit line running from the central office equipment to the isolation jack, i.e., line 22*b*, it is now coupled via spring contact 23*b* through bottom half 30*b* of split pin 30 and capacitor C2 to ground via pin half 32*a*, spring contact 29*a* and line 29. As for the ring circuit line leading from the central office equipment to the isolation jack, i.e., 25*b*, it is now coupled through spring contact 24*b* and split pin contact 31*b* to recorder III via C4, split pin contact 32*b*, bus bar spring contact 28*a* and line 28. In this way the calling subscriber is coupled to the recording stating the general out-of-service status. On the other hand the tip line leading from the central office equipment to the isolation jack, i.e., 22*b*, is coupled so as to inhibit any attempt on the calling party's part to communicate with the out-of-service subscriber. In this regard it is to be noted also that the out-of-service subscriber ring line is also coupled to ground by way of capacitor C3 and pin half 32*a* leading to spring contact 29*a* in line 29.

This system lends itself to a variety of different plug arrangements to correspond to different out-of-service conditions, as illustrated by the line running from recorder I designated as having a new service message, running from line 26 and spring contact 26*a* to be coupled to pin half 33*b* of pin 33 to the junction 40 indicated by the arrow in FIG. 4. Here it may be seen that the line running from capacitor C1 to pin half 33*a* may instead be connected to pin half 33*b*, thus offering in place of the recorder II message to the disconnected subscriber the recording number I message of new service. Other plug and jack strip combinations and arrangements are of course entirely within the scope of the invention.

Thus, it can be seen from the plug-jack configuration illustrated in FIG. 4 that the out-of-service subscriber, upon attempting to make a phone call, will be connected to only a recording indicating to him the specific out-of-service condition. On the other hand the calling subscriber also will be connected to a separate recording in which the calling party will be appraised of the general out-of-service status.

The specific construction of plug arrangement 21 may comprise a central portion having a removable cover for parts replacement, or it may be case solid with the individual components.

In the third system arrangement as illustrated particularly in FIGS. 3 and 4, wherein the MDF is equipped with a recorded announcement bus bar carrying three or more different announcements, the special plugs used to cut off the subscriber and contact the bus bar for the desired recordings would as indicated be different for each application. Moreover they could be different color, i.e., color coded, or having some form of printing thereon indicating the specific out-of-service recording treatment provided. Specifically the plugs may be arranged to connect recordings to the subscriber, to the central office (i.e., to the calling party), or to both. The capacitors which would be built into the plug effectively prevent customers from talking to each other.

Some of the advantages to the present invention and in particular the system arrangement illustrated in FIGS. 3 and 4, are as follows: (1) Most of the changes to a customer's service would be accomplished on the MDF. Present methods require changes in the equipment, such as strapping or translator diodes. (2) This arrangement of connecting recordings would be the same for all types of offices, which invariably would reduce errors in administrative problems. The plugs for instance could be color coded and printed for each application. (3) The system is extremely flexible. Various combinations of recordings can be assigned to each MDF block of say 20 station lines. For example on residents' phones three recordings would be available: (*a*) disconnect for non-payment (line); (*b*) temporary out of service (C.O.); (*c*) phone disconnected-call information (C.O.). On pay stations for instance three recordings could be available: (*a*) this pay station is out of service (line); (*b*) temporarily out of service (C.O.); (*c*) phone disconnected-call information. There also could be a vacation disconnection or temporary disconnection wherein two recordings would be available: (*a*) not connected (line); (*b*) temporarily out of service (C.O.). And lastly, new service messages, for example large line additions, would be available. These messages would consist of "your telephone will be in service on . . . (date)."

Referring to FIG. 5, there is shown an alternative implementation of the invention in terms of another existing isolation jack. The arrangement of FIG. 5 is intended to show suggested plug-jack substitutes in terms of alternative physical jack configurations. It is intended, however, that the circuit parts and chamber designs would be exchangeable with each other.

Figures 6A, 6B, 6C:
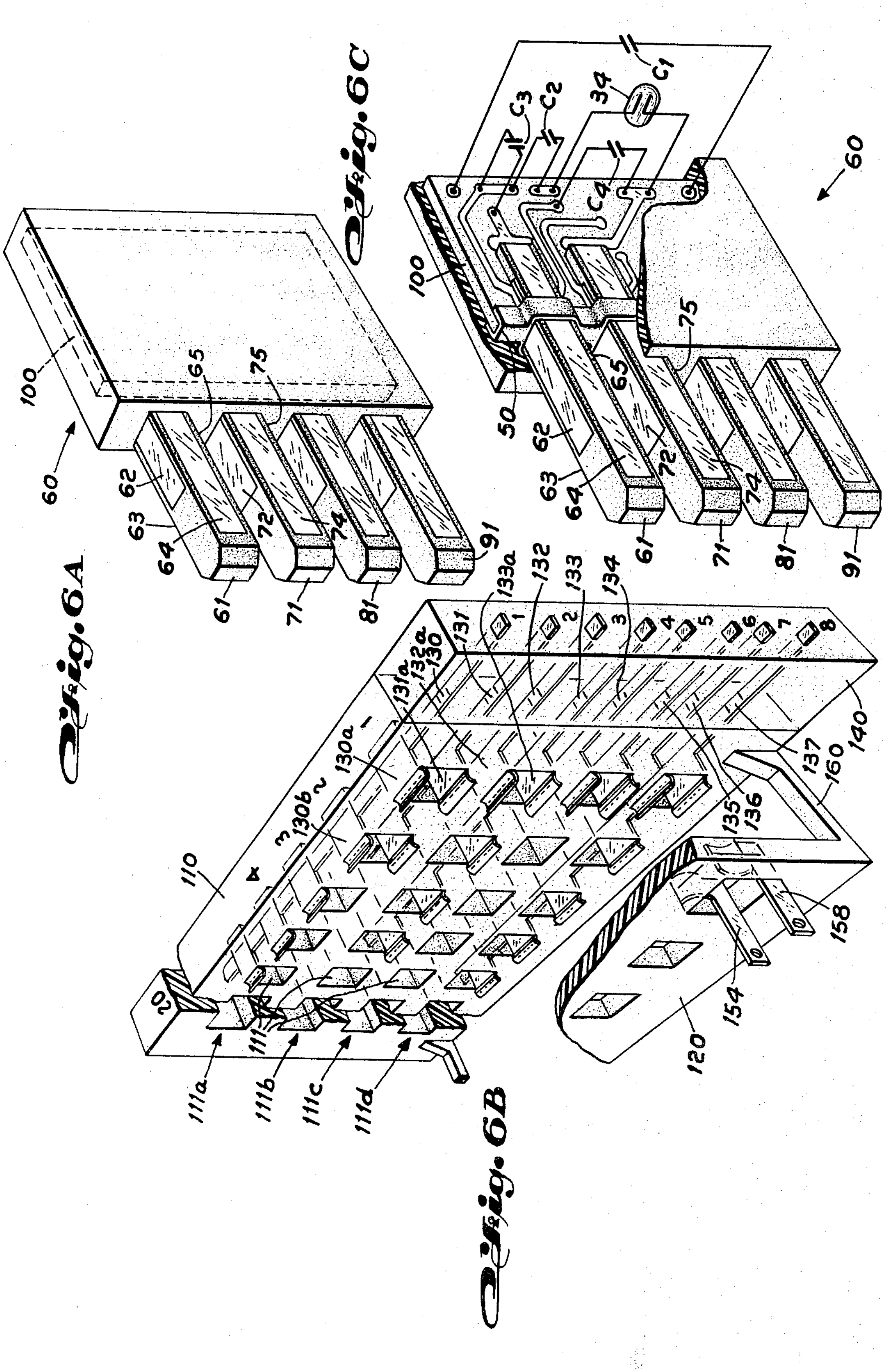
FIGS. 6A–6C illustrate in perspective views another unique plug-jack arrangement according to the invention.

Referring now to FIGS. 6A–6C, illustrated therein in perspective views are a plug unit (FIG. 6A) of unique design intended for operation with a contact jack strip (FIG. 6B), the combination of this plug-jack arrangement also constituting a unique effort, and a second plug (FIG. 6C) which is a partial sectional view of the plug of FIG. 6A showing the components of the printed circuit board schematically, and the cooperation of the printed circuit board plug/pin arrangement.

In FIGS. 6A and 6C it may be seen that the plug arrangement 60 may be structurally divided, for purposes of discussion, into three parts, namely the pins 61, 71, 81 and 91, the encapsulated printed circuit board 100, and the interfacing pin-to-printed-circuit jack 50. The circuitry contained in the plug 60 is the same as that shown contained in the plug 35 of FIG. 4. Hereinafter, specific comparison reference to the FIG. 4 printed circuit circuitry, pins, and generally connections will be made either directly or by FIG. 4 reference designators in parentheses where substantially identical considerations are involved in the two embodiments. From the following it will become apparent that the plug arrangement of FIGS. 6A, 6C has a considerably greater capacity than the plug arrangement of FIG. 4, inasmuch as all of the circuitry of the FIG. 4 plug, including all the halves of the split pins, are incorporated on a portion of the printed circuit board illustrated in FIGS. 6A and 6C and only using the first two pins 61 and 71 of plug 60; the plug arrangement 60 therefore has provision in pins 81 and 91 and the remainder of the printed circuit board 100 for additional recorder connection facilities or other desired functions to be provided by the unique plug-jack assembly depicted in FIGS. 6A–6C.

Each of the pins 61, 71, 81 and 91 of plug 60 are blunted at the free end and are substantially square in cross-section to provide four working sides. On each of these sides is a metallic contact strip, say 62–65 of pin 61. Note that on each pin (although not particularly shown) the opposite side strips begin the same distance from the free end of the pins, wherein the left and right side strips, say 63, 64 and 73, 74 of pins 61 and 71 respectively, extend longitudinally along the respective pin substantially closer to the free end of the pins than do contact strips 62, 65 and 72, 75. To be noted also is the fact that all the left and right side contact strips of the pins have their origins the same spaced amount from the pin free ends; similarly all of the top and bottom strips extend equally.

These metallic contact strips are set in recesses of cooperating shape as formed in the dielectric (plastic) base of pins 61–91. The strips are secured or held into place in part by the pin-to-printed-circuit jack 50. Jack 50 is also of plastics material and is of substantially U-shaped cross-section, with apertures therein spaced appropriately to receive the pins. Jack 50 fits unto the front edge of the printed circuit board 100, and in so doing also clamps the contact strips down to remain in their respective recesses.

On the printed circuit board in typical manner is provided the various connections and components seen in the plug printed circuit board 35 of FIG. 4. The components are shown in FIG. 6C in schematic form.

With the contact strips appropriately soldered to their respective printed circuit board connections, which serves also to hold same in place, and the plastic pins are themselves secured to the printed circuit board by gluing or other suitable means, the printed circuit board 100, the jack 50 and the fixed ends of the pins 61-91 are encapsulated in a plastics material, thus providing a single plug unit.

In FIG. 6B there is represented a contact jack strip configured to cooperate particularly with plug designs as represented in FIGS. 6A and 6C. The main structural pieces of the contact jack strip are provided by a face or front plate 110 and a corresponding back plate 120. The two plates are interconnected structurally at a predetermined separation commensurate with the origins of the short and long metal inlays of pins 61–91 by means of members 130, of which only one is shown in FIG. 6B for clarity. Front and back plates 110, 120 as well as members 130 are constructed of any suitable rigid dielectric material such as a plastics material. Both plates 110 and 120 are shown fragmented for clarity and convenience.

Through both plates 110 and 120 are formed a series of apertures 111, 121 running from front to back major surfaces, which apertures are intended to have substantially the cross-sectional form of the plug 60 pins 61–91. The apertures 111, 121 are arranged in four rows **111*a*–111*d* (121*a*–121*d* in the back plate 120) to accommodate the four pins of each plug 60, and N number of columns, depending on the desired facilities. The apertures 111, 121 form in essence a matrix arrangement. Note in FIG. 6B that the first four columns are numbered in the face plate 110 arrangement; moreover, the present example embodiment is intended to provide twenty columns, as represented by the 20 designator at the far (left) end of front plate 110.**

In the formation of the contact jack strip plate 110, by way of molding techniques, conductive metallic strips 130–137, horizontally running, two to an aperture row, are molded into place, each with an end extension protruding from the same end of plate 110. The end protrusion of the conductive strips 130–137 are in turn coupled to a recorded announcement bus and contact assembly by way of a multiple intermediary connector at 140. Each of the conductive strips 130–137 have periodic rearward-protruding spring contacts (e.g., **130*a*, 130*b*, . . . of strip 130), of the type having a flat main section and a U-shaped indentation running from side to side at the back edge of the flat section and parallel to the associated aperture row. In fact, the indented U-shaped portions are arranged to be parallel with the top or bottom edge of the apertures in the associated row, and in one-to-one correspondence. There are two such spring contacts (e.g., 130*a* and 131*a*) with U-shaped indentations for every aperture in plate 110, wherein contact strips 130, 132, 134 and 136 provide the upper spring contacts for respectively rows 111 *a*, 111*b*, 111*c* and 111*d*, while contact strips 131, 133, 135 and 137 provide the oppositely arranged lower spring contacts for respectively rows 111*a*–111*d*. As may be expected, the U-shaped portions project such that when a plug 60 is inserted into the contact jack strip, these "upper and lower" U-shaped portions make contact respectively with the upper and lower "short" inlaid metal contact strips of pins 61–91.**

In the illustrated example embodiment of FIGS. 6A–6C, metallic conductive contact strip 130 (also numbered 1 in FIG. 6B for the recorded announcement bus) of front plate 110 is coupled through connector 140 to ground. In similar fashion strips 131, 132 and 133 (respectively 2, 3 and 4 on the recorded announcement bus) are connected respectively to Recorder III (Calling Subscriber), Recorder I (New Service), and Recorder II (Disconnected Subscriber). These recorder connections in turn refer to respectively connections 28, 26 and 27 in FIG. 4 with the ground connection on strip 130 representing a duplicate of the connection 29 in FIG. 4.

Referring now to the back plate 120 construction of the contact jack strip arrangement depicted in FIG. 6B, plate 120 is also of molded dielectric material with its apertures (directly behind the apertures in plate 110) guarded by spring contacts having substantially the same construction as provided for plate 110. There are, as before, two oppositely arranged spring contacts per aperture for plate 120, with the oppositely arranged contacts this time being arranged on the left and right sides of the aperture to accommodate the "long" inlaid metallic contact strips of the plug 60 pins 61–91. Although it is intended in FIG. 6B that the left-side spring contacts say for column 1 be designated 151–154 and the right-side contacts 155–158, only contacts 154 and 158 associated with the lowermost (fourth) aperture are shown for clarity. It is of course within the scope of this invention to reverse the orientations of the spring contacts in the front and back plates. In the illustrated example embodiment it is intended that spring contact 151 associated with aperture number 1 of column 1 be coupled to the out-of-service subscriber's line ring side (designated 25*a* in FIG. 4), while spring contact 155 associated with the same aperture is to be coupled to the out-of-service subscriber's line tip side (designated 22*a* in FIG. 4). Similarly, for aperture number 2 of column 1, spring contact 152 is to be coupled to the Central Office T line (designated 22*b* in FIG. 4), while spring contact 156 is to be coupled to the Central Office R line (25*b* in FIG. 4). While the spring contacts 154 and 158 as well as the other spring contacts associated with plate 120 are intended to have rearward extensions leading to wire wrap or solder terminals for individual connection in the example embodiment, it is of course well within the spirit of this invention to also have interconnecting row of column contact arrangements (strapped common) such as that described with reference to front plate 110. The spring contacts associated with the back plate 120 are of course intended to make contact with the long contacts of pins 61–91 when a plug 60 is inserted (vertically oriented) into the contact jack strip assembly. Although not shown, back plate 120 also has twenty columns of apertures in the example embodiment.

When a plug 60 is inserted say into column 1 of the contact jack strip assembly, the following connections are established, which connections are also cross-referenced to the FIG. 4 arrangement by the reference designators of the latter arrangement being in parentheses. Recorder II to be connected to the out-of-service subscriber, is coupled to terminal 4 (27) of the recorded announcement bus, through the connector 140 to contact strip 133 where the recorded message is fed to spring contact 133*a* (27*a*) and over to the plug circuitry by way of metallic inlay contact 75 (33*a*) of pin 71 (33). From there the printed circuit board 100 establishes continuity with one side of capacitor C1, with the other side of C1 in turn having contact established on the printed circuit board 100 with the long left-side strip contact 63 (30*a*) of pin 61 (30). Strip contact 63 (30*a*) of pin 61 (30) makes contact with spring contact 151 (23*a*) of back plate 120, which in turn is coupled to the out-of-service subscriber tip side (22*a*). Recorder number III, to be connected to the calling subscriber, is coupled to terminal 2 (28) of the recorded announcement bus, through the connector 140 to contact strip 131 where this recorded message is fed to spring contact 131*a* (28*a*) and over to the plug circuitry by way of strip inlay contact 65 (32*b*) of pin 61 (32). From there the printed circuit board 100 establishes continuity with capacitor C4, with the other side of C4 in turn having contact established on the printed circuit board 100 with the long right-side strip contact 74 (31*b*) of pin 71 (31). Strip contact 74 (31*b*) of pin 71 (31) makes contact with spring contact 156 (24*b*) of back plate 120, which in turn is coupled to the Central Office R line (25*b*).

The out-of-service subscriber ring side (25*a*) is coupled to spring contact 155 (24*a*) of back plate 120 which leads to the plug 60 circuitry by way of long inlay strip contact 64 (31*a*) of pin 61 (31). Continuity is established therewith by the printed circuit board 100 through to one side of capacitor C3, the other side of which is coupled by the printed circuit board 100 to short strip contact 62 (32*a*) of pin 61 (32). Contact 62 engages with spring contact 130*a* (24*a*) of contact strip 130 which leads through connector 140 to ground (29).

The Central Office T line (22*b*) is coupled to spring contact 152 (23*b*) of back plate 120, which leads to the plug 60 circuitry by way of long inlay strip contact 73 (not shown) (30*b*) of pin 71 (30). Continuity is established by the printed circuit board 100 between long inlay contact 73 and one side of capacitor C2, the other side of which is coupled to the side of capacitor C3 which is associated with ground as established above.

Recorder number I, for new service messages is coupled to terminal 3 (26) of the recorder announcement bus, through connector 140 to contact strip 132 where the recorded message is fed to spring contact 132*a* (26*a*) and over to the plug 60 circuitry by way of metallic inlay contact 72 (33*b*) of pin 71 (33). Inlay contact 72 of pin 71 leads to an open circuit terminal positioned on the printed circuit board 100 close to the line for example leading from short inlay contact 75 to capacitor C1, wherein connection may be established in a different plug arrangement, as described hereinbefore with reference to designator 40 of the plug arrangement in FIG. 4.

Moreover, the neon lamp 34 is connected in identical electrical fashion to the arrangement depicted in FIG. 4. In the case of FIGS. 6A–6C, however, continuity is established by the printed circuit board 100 between one terminal of neon lamp 34 and long metal inlay contact 73 (30*b*), and between the other lamp 34 terminal and long metal inlay contact 74 (31*b*). The operation of the plug-jack arrangement of FIGS. 6A–6C is intended to be the same as that described with reference to FIG. 4.

While the principles of this invention have been described above in connection with specific apparatus, it is to be understood that this description is made only by way of example and not as a limitation on the scope of the invention as set forth in the objects and features thereof and in the accompanying claims.

I claim:

1. An improved system for connecting recorded messages to telephone subscriber's lines for application on the main distributing frame of the central office telephone equipment of the type having an isolation plug-jack arrangement and a recorder distribution block wherein the improvement comprises a cut-off plug having:

a. a first plug member for disconnecting an out-of-service subscriber's line from the central office equipment by separating a first pair of contacts within said jack, said first plug member including a first jumper for coupling one of said out-of-service subscriber's contacts to a first recorded message when said plug is coupled with said jack; and b. a second plug member for disconnecting an incoming caller's line from the central office equipment by separating a second pair of contacts within said jack, said second plug member including a second jumper for connecting one of said incoming caller's contacts to a second recorded message and means for activating a central office ring cut-off relay whereby said out-of-service subscriber becomes connected with said first recorded message when attempting to place a call on said central office equipment, and said incoming caller becomes connected with said second recorded message when attempting to place a call to said out-of-service subscriber.

2. An improved system for connecting recorded messages to telephone subscriber's lines for application on the main distributing frame of the central office telephone equipment of the type having an isolation plug-jack arrangement and a recorder distribution block wherein the improvement comprises a cut-off plug having:

a. a first plug member for disconnecting an out-of-service subscriber's line from the central office equipment by separating a first pair of contacts within said jack, said first plug member including a first jumper for coupling one of said out-of-service subscriber's contacts to a first recorded message;

b. a second plug member for disconnecting an incoming caller's line from the central office equipment by separating a second pair of contacts within said jack, said second plug member including a second jumper for connecting one of said incoming caller's contacts to a second recorded message when said plug is coupled with said jack; and c. a neon lamp electrically coupled between said first and second plug members for transferring said incoming caller to said second recording by means of a voltage applied between said first and second plug members when said caller attempts to place a call to said out-of-service subscriber through the central office telephone equipment, whereby said out-of-service subscriber becomes connected with said first recorded message when attempting to place a call on said central office equipment, and said incoming caller becomes connected with said second recorded message when attempting to place a call to said out-of-service subscriber.

3. A system for connecting recorded messages to telephone subscriber's lines for application on the main distributing frame of the central office telephone equipment of the type having an isolation plug-jack arrangement comprising in combination:

a. a jack having first, second, third and fourth jack members, each of said jack members having a pair of first and second contacts, said first contact of said first jack member being electrically coupled to one of said out-of-service subscriber's lines and said second contact of said first jack member being electrically coupled with one of said incoming caller's lines, said first contact of said second jack member being electrically coupled with another of said out-of-service subscriber's lines, said second contact of said second jack member being electrically coupled with another of said incoming caller's lines, said first contact of said third jack member being electrically coupled to ground, said second contact of said third jack member being electrically coupled to a second recorded message, said first contact of said fourth jack member being electrically coupled to a first recorded message and said second contact of said fourth jack member being electrically coupled to a third recorded message; and b. a cut-off plug having first, second, third and fourth plug members, each of said plug members having a pair of first and second contacts wherein said first contact of said first plug member is electrically coupled with said first contact of said fourth plug member, said second contact of said first plug member is electrically coupled with said first contact of said second plug member and said first contact of said third plug member, said second contact of said second plug member is electrically coupled with said second contact of said third plug member, for disconnecting an out-of-service subscriber from the central office telephone equipment and connecting said out-of-service subscriber to a first recorded message; and for disconnecting an incoming caller to said out-of-service subscriber from the central office telephone equipment and connecting said incoming caller to a second recorded message when said cut-off plug is intercoupled with said jack.

4. The system of claim 3 further including a neon glow lamp coupled between said second connector of said first plug member and said second connector of said second plug member for operating a ring cut-off relay within the central office equipment when said incoming caller places a call to said out-of-service subscriber.

* * * * *